J. A. HERRICK.
REVERSING VALVE.
APPLICATION FILED JULY 5, 1912.

1,069,136.

Patented Aug. 5, 1913.
2 SHEETS—SHEET 1.

WITNESSES

INVENTOR
James A. Herrick,
BY
ATTORNEY.

J. A. HERRICK.
REVERSING VALVE.
APPLICATION FILED JULY 5, 1912.

1,069,136.

Patented Aug. 5, 1913.
2 SHEETS—SHEET 2.

WITNESSES

INVENTOR
James A. Herrick,
BY
ATTORNEY.

UNITED STATES PATENT OFFICE.

JAMES A. HERRICK, OF NEWARK, NEW JERSEY.

REVERSING-VALVE.

1,069,136.   Specification of Letters Patent.   Patented Aug. 5, 1913.

Application filed July 5, 1912. Serial No. 707,819.

*To all whom it may concern:*

Be it known that I, JAMES A. HERRICK, a resident of Newark, in the county of Essex and State of New Jersey, (whose post-office address is 90 West street, New York city, New York,) have invented certain new and useful Improvements in Reversing-Valves, of which the following is a specification.

This invention relates to a new and useful reversing valve such as is used in connection with gas producer installations, adapted to control the communication between a plurality of ports.

One of the objects of the invention is to provide a valve for the purpose mentioned which is particularly easy to operate, and which is readily maintained in operative condition.

Other objects and aims of the invention, more or less broad than those referred to, together with the advantages inherent, will be in part obvious and in part pointed out in the course of the following description of the elements, combinations, arrangements of parts, and applications of principles constituting the invention; and the scope of protection contemplated will appear in the claims.

Figure 1:
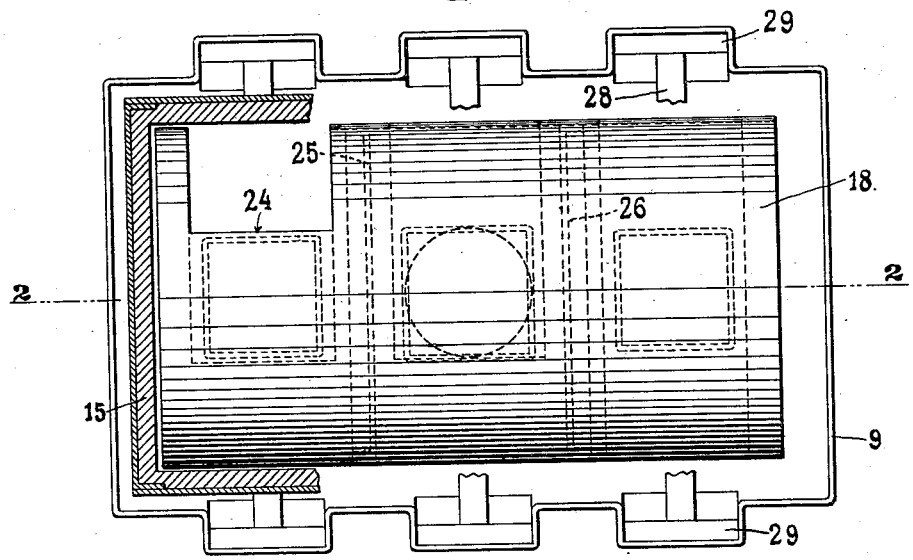
Figure 2:
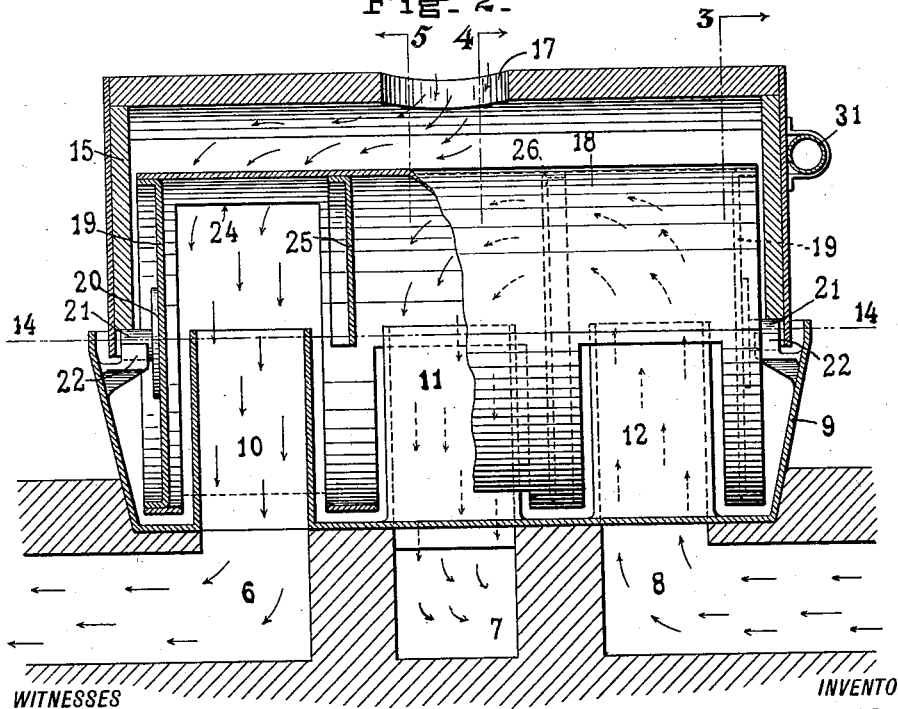
Figure 3:
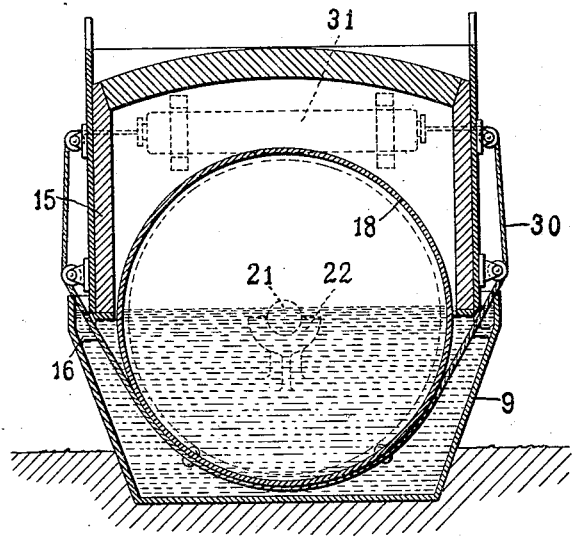
Figure 4:
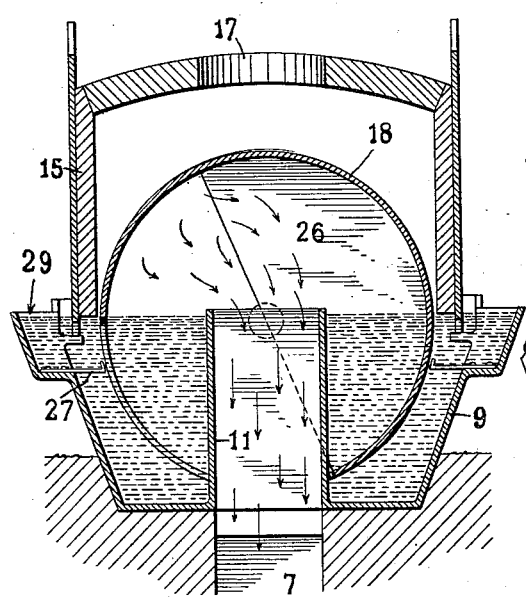
Figure 5:
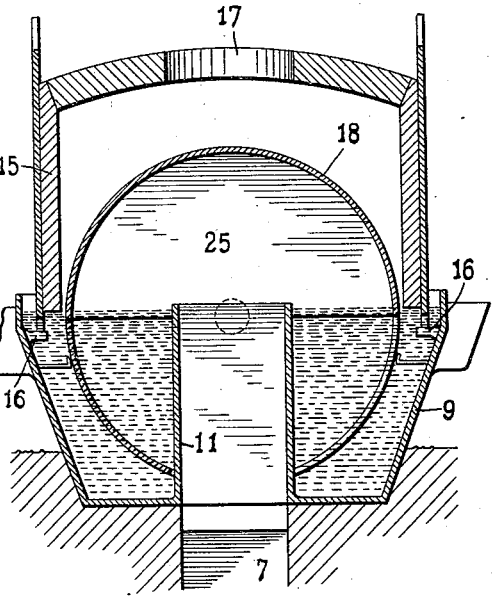

In the accompanying drawings, which are to be taken as a part of this specification and in which I have shown a form of embodiment of the invention at present preferred, Figure 1 is a plan view, partly in section and partly broken away, illustrating the application of my invention, Fig. 2 is a section, partly in elevation and partly broken away on the line 2—2 of Fig. 1, Fig. 3 is a section on the line 3—3 of Fig. 2. Fig. 4 is a section on the line 4—4 of Fig. 2, looking in the direction of the arrow; and Fig. 5 is a section on the line 5—5 of Fig. 2, looking in the direction of the arrow.

Referring to the numerals on the drawings, and particularly to Fig. 2, there are shown three passages, 6, 7, and 8, formed in the masonry or ground work of an installation. 9 indicates a pan or water seal, which has openings in its bottom registering with the mouths of the passages 6, 7, and 8, these openings being defined by upstanding tubes 10, 11, and 12, respectively, said tubes, as well as the mouths of the passages with which they register, being preferably in horizontal alinement for the purposes of my invention. The upper ends of the tubes 10, 11, and 12 may be flush with the upper edges of the pan 9, and the level of the water constantly maintained in the pan or water seal 9 is indicated by the line 14 in Fig. 2. 15 indicates a casing, which may be and preferably is brick-lined, said casing depending into the water seal 9, and resting upon spaced lugs 16 projecting from the inner walls of the pan or seal 9, in such manner that the lower edges of the casing will be below the water level in the water seal, and that the casing will be sealed by the water seal. In the top of the casing 15 there is a port 17, which, in the form of apparatus shown, is intended to have communication with either of the passages 6 or 8, as desired, while, simultaneously with such alternative communication, the passage 7 will have communication with the remaining one of the passages 6 or 8. The control of these communications is through the reversing valve now to be described, which coöperates with the several ports and with the water seal in the performance of the desired functions. In the drawings I have shown this valve as consisting of a generally cylindrical hollow member 18, which is made up of circular end pieces 19 and a generally cylindrical intermediate portion. Trunnion plates 20 are secured upon the end pieces 19 and carry trunnions 21 which are supported in suitable bearings 22 formed in the opposite walls of the pan 9. The cylindrical structure 18 overlies each of the ports 10, 11, and 12 and it is provided with arcuate slots whereby the upstanding ports 10, 11, and 12 enter the interior of the cylinder. The slot through which port 11 enters the cylinder is always, in the normal operation of the apparatus, entirely under water. The slot for the port 10 extends transversely of the axis of the cylinder to such an extent that when the cylinder is rotated on its trunnions the outer end of said slot, which appears at 24 in Fig. 1, will project well above the water level in the water seal, the inner end of this slot never, in the normal operation of the device, appearing above the water level. A similar slot is provided for the port 12, and the arrangement is such that when the cylinder is rotated to bring the outer end of the slot for the port 10 above the water line, as in Fig. 1, the whole extent of the slot for the port 12 will be below the water line; and when the cylinder is reversely rotated so as to bring the whole extent of the slot for the port 10 below the water line, then the outer end of the slot for the port 12 will be above the water line, but on the opposite side of the axis of the cylinder from the position of the end 24 in Fig. 1. The movements of the cylinder will of course be such that one of these slots will be partly exposed above the water, while the other slot is entirely below the water line; and the inner ends of these slots, contacting with their respective ports 10 or 12 will afford the necessary limitation for the rotative movement of the cylinder in both directions.

Thus far I have described a valve which permits communication between either of the ports 6 and 8 and port 17, through the cylindrical valve. The arrangement whereby when one of said passages 6 or 8 is in communication with the port 17, the other of said passages 6 or 8 will be thrown into communication with passage 7 will be now described. Secured to the inner wall of the cylinder at each side of the slot for the port 11 are half partitions 25 and 26, which are so positioned that when one of said partitions as for instance 25, has its edge entirely below the water level, as in Fig. 5, the other of said partitions will have half of its diametrical edge below water level and the other half above the water level, as shown in Fig. 4. It will be evident that if the cylinder be rotated to bring the half partition 26 of Fig. 4 to a position corresponding to that of the half partition 25 in Fig. 5, the partition 25 will at the same time assume a position like that previously occupied by that of partition 26. Accordingly, as the cylinder is rotated to one position or the other there will be a passage between the port 11 and one of the ports 10 or 12, according to which one of the partitions 25 and 26 is water sealed, it being understood of course that when one is water sealed the other will not be water sealed, and will permit communication past it.

The control of the several ports 10, 11, 12 and 17 may now be understood, referring to Figs. 1, 2, 4 and 5. As shown in Figs. 1 and 2 the outer end of the slot for the port 10 is above water, so that there is communication between ports 10 and 17, through the cylinder wall. This outer end of the slot for the port 10 provides the only opening through the wall of the cylinder which is at this time exposed, the outer end of the slot for the port 12 being under water, as is in fact the whole of that slot. Neither can there be any communication between ports 10 and 17 through the interior of the cylinder to any of the other ports, because the half partition 25 is now in the Fig. 5 position and water sealed. The half partition 26 is however in the Fig. 4 position, so that there is free communication between the ports 11 and 12, past the exposed edge of the partition 26. In reversing the valve the outer end of the slot for the port 10, as well as the whole extent of said slot, is brought below the water level, while the outer end of the slot for the port 12 appears above the water level. At the same time the half partition 25 assumes the Fig. 4 position heretofore maintained by the half partition 26, while the half partition 26 takes the position theretofore maintained by the partition 25. Consequently, there is now communication between the ports 12 and 17, and between the ports 10 and 11. Care will of course be taken to make the various openings and passages of proper size for the desired freedom of communication.

In case there should be a deposit of soot or other material upon the outside of the cylinder, this may be provided for by way of a scraper 27 at each side of the cylinder below the water level, this scraper comprising a longitudinally extending member bearing against the cylinder and supported at intervals by arms 28 extending from the side walls of the pan 9, or from lateral pockets 29 of such pans. The material collected by the scraper may be removed very readily by way of such pockets 29 whenever necessary. For oscillating the cylinder to its two positions, any desirable means may be employed. For instance, one of the trunnions 21 might be extended out beyond the water seal and provided with a hand wheel whereby the valve could be turned. I have shown a cylinder provided at one end with a cable 30 secured thereto and passing around the same, the ends of the cable extending out of the water seal at opposite sides of the cylinder and being connected to a fluid operated cylinder-and-piston device 31, which is adapted to draw either end of the cable as desired, thereby to rock the cylinder 18 in opposite directions. Any other operating means may be employed.

It is thought that the mode of operation of the apparatus will be apparent from the foregoing. It may be pointed out, however, that the surface of the cylinder with the exception of a small part, is water cooled in the water seal in the course of the operation of the device; and to insure that the entire surface of the cylinder shall be kept cool, a spray of water may be provided in the inner wall of the top of the casing. This water will of course flow off along the curved surfaces of the valve. By providing a relatively deep water seal I insure against too rapid heating and evaporation; while the fact that there need be within the casing and a water seal no moving parts beyond the valve itself, which of course has no movement of translation, insures that the operation will be always free. Since the valve simply turns in its bearings, but very little force is needed to reverse it, and the entire structure is comparatively simple and very economical.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

Having thus described my invention, what I claim as new and desire to secure by Letters Patent, is:

1. A valve member for the purpose described comprising a generally cylindrical shell having a plurality of arcuate slots in its circumference spaced longitudinally of the shell, and an interior partition located between adjacent slots and extending transversely of the shell.

2. An apparatus of the kind described provided with a plurality of water-sealed ports, and a hollow member overlying the mouths of said ports and movable with respect thereto, said hollow member having a pair of openings in its wall which are respectively above and below the level of the water-seal in accordance with the movements of said hollow member.

3. An apparatus of the kind described provided with a plurality of water-sealed ports, a hollow member overlying the mouths of said ports and movable with respect thereto, said hollow member having a pair of openings in its wall which are respectively above and below the level of the water-seal in accordance with the movements of said hollow member, and a partition inside the hollow member between said openings.

4. An apparatus of the kind described provided with a plurality of alined water sealed ports, a hollow valve member into which said ports extend, said valve member extending into said water seal and being rotative to two positions, there being an opening in the valve member for each one of the end ones of said ports, one of said openings being above the water seal when the other is below it and vice versa, according to which one of its rotative positions the valve has assumed, and said valve member being provided with half-partitions, one on each side of the third of said ports, one of said partitions being sealed and the other unsealed in one position of the valve member, and vice versa in the other position of the valve member, the interior of the valve member being unobstructed except for said partitions.

5. An apparatus of the kind described provided with a plurality of ports, certain of which are water sealed and each one of two whereof may be put into communication with either one of two others, and a valve member rotative with its axis horizontal and coöperating with said water-sealed ports to control the communication between all of the ports.

6. An apparatus of the kind described provided with a plurality of ports, certain of which are water sealed and each one of two whereof may be put into communication with either one of two others, and a hollow valve member rotative with its axis horizontal and coöperating with said water-sealed ports to control the communication between all of the ports.

7. An apparatus of the kind described provided with a plurality of water sealed ports, and a valve member rotative with its axis horizontal, said valve coöperating with said ports and the water seal to control the ports.

8. An apparatus of the kind described provided with a plurality of water sealed ports, and a hollow valve member rotative with its axis horizontal, said valve coöperating with said ports and the water seal to control the ports.

9. In an apparatus of the kind described, a valve rotative with its axis horizontal, and means for rotating the same comprising a cable passing about the valve transversely of its axis, and means for applying draft to either end of the cable at will.

10. An apparatus of the kind described having a plurality of water sealed ports, and a rotative valve controlling said ports, said valve having no movement of translation.

11. An apparatus of the kind described having a plurality of water sealed ports and a rotative valve depending into the water seal and controlling said ports, said valve having no movement of translation.

12. An apparatus of the kind described having a water-sealed port, and a hollow rotative valve member covering the mouth of the port and depending into the water-seal, the wall of said member having an opening therein which is below the level of the water-seal in one rotative position of the valve member, and above the level of the water in another rotative position of the valve member.

In witness whereof I have hereunto signed my name in the presence of two witnesses.

JAMES A. HERRICK.

Witnesses:
A. C. McDonnell,
Alda L. Miller.